Figure 3:
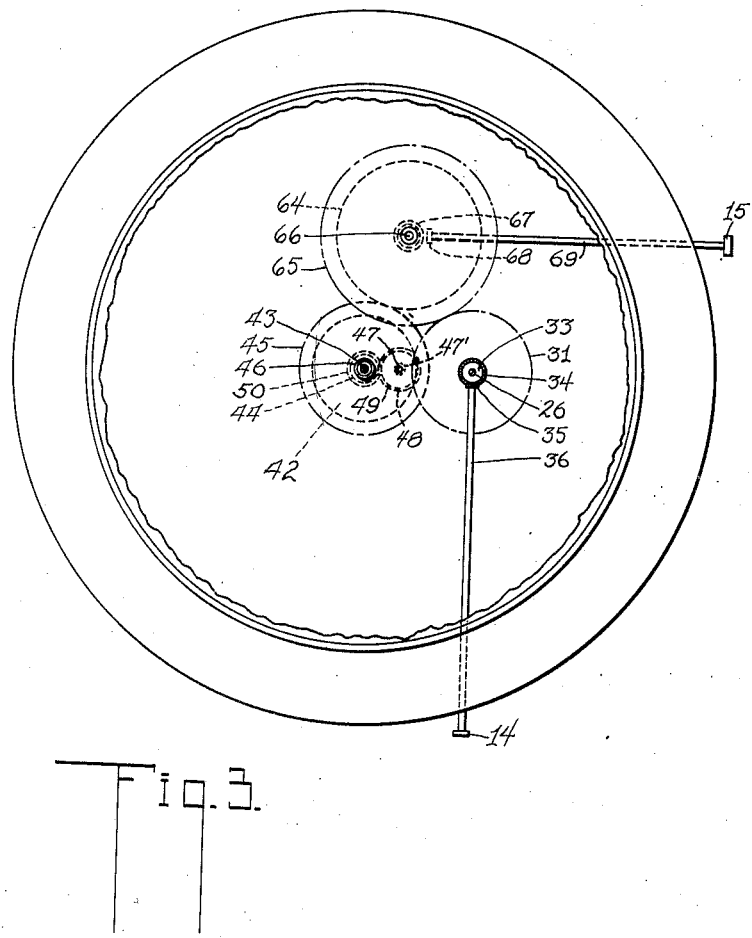

Dec. 10, 1940.     G. R. McDONALD     2,224,268
ELECTRICALLY OPERATED SIDEREAL CLOCK
Filed March 9, 1938          2 Sheets-Sheet 1
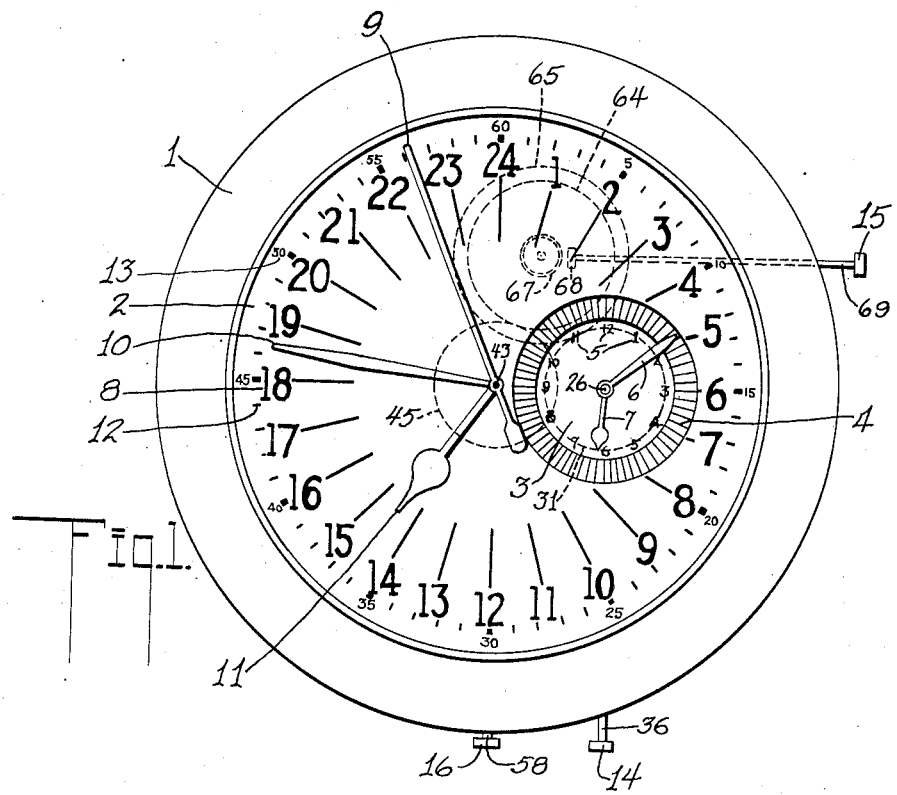
INVENTOR.
GEORGE R. McDONALD
BY Munn, Anderson & Liddy
ATTORNEYS.

Dec. 10, 1940.    G. R. McDONALD    2,224,268
ELECTRICALLY OPERATED SIDEREAL CLOCK
Filed March 9, 1938    2 Sheets-Sheet 2

INVENTOR.
GEORGE R. McDONALD
BY
Munn, Anderson & Lidd
ATTORNEYS

Patented Dec. 10, 1940

2,224,268

UNITED STATES PATENT OFFICE 2,224,268

ELECTRICALLY OPERATED SIDEREAL CLOCK

George R. McDonald, Oakland, Calif.

Application March 9, 1938, Serial No. 194,822

6 Claims. (Cl. 58—3)

My invention relates to improvements in an electrically operated sidereal clock, and it consists of the combinations, constructions and arrangements hereinafter described and claimed.

An object of my invention is to provide an electrically operated sidereal clock which is an improvement over my invention on a Manual or automatic means for correcting timekeeping mechanisms, patented January 5, 1937, No. 2,066,357. In the patented device, I show translation gears placed between a synchronous motor and a clock mechanism for causing the clock mechanism to keep sidereal time with a yearly error of 57.28 seconds. I further show in the patent, a correcting mechanism operated by the clock mechanism for continuously correcting the sidereal time so that an error of only one-half a second in a year result instead of 57.28 seconds.

I am well aware that clocks have been made which show both mean solar and the corresponding sidereal time operated by a common prime mover. The prime mover may be regulated to keep either mean solar or sidereal time, and the other form of time corresponding to that to which the prime mover is regulated, is derived by a connecting gear train designed to give as nearly as possible the ratio 1.00273791 which closely represents the ratio given by the length of the solar day divided by the length of the sidereal day (Scientific American, December, 1937, page 361) These clocks depend upon direct gear trains which require gears having a large number of teeth and therefore of a size that will be too large for standard sized clocks.

In the present invention, both sidereal and solar clock mechanisms are operated by a prime mover. A planetary gear train is provided in the sidereal clock mechanism, and the sun gear of this train is directly connected to the solar clock mechanism by a train of gears which will give a ratio sufficiently close to the ratio 1.00273791, that in one year, the indication shown by the sidereal time indicating hands, lags .024 second behind the indication which would be shown if the gear ratio between the two clock mechanisms were exact. The gears used in the planetary train and in the train connecting the sun gear with the solar clock, are of the size usually used in clock mechanisms. The sidereal sweep second hand should have 3.94258933 revolutions added to it daily. This value is based on the value of the sidereal difference per day as stated in the December, 1937, Scientific American, page 361; namely, three minutes and 56.55536 seconds. I have found a gear ratio that will add 3.942588235 revolutions a day to the clock mechanism giving sidereal time and therefore correct sidereal time will result with the exception of the slight error of .024 second which the clock will run slow in a year.

Other objects and advantages will appear in the following specification, and the novel features of the device will be particularly pointed out in the appended claims.

My invention is illustrated in the accompanying drawing forming a part of this application, in which Figure 1 is a front elevation of the device;

Figure 2 is a schematic view of the gear mechanisms in both the solar and sidereal clocks showing the gears twice their normal size for clarity; and Figure 3 is a section along the line 3—3 of Figure 2 and shows the gear in natural size and correctly positioned in the clock casing.

In carrying out my invention, I provide a clock casing indicated generally at 1 and this casing has a face 2. Both the solar time and sidereal time are indicated on the face 2. The face 2 is provided with a circular depression 3 in which a dial 4 is marked for indicating solar time. Numbers 5 are placed adjacent to the markings on the dial 4 and indicate the solar hours from one to twelve in the usual manner. A solar minute hand 6 and a solar hour hand 7 are movable over the dial 4 in the usual manner for indicating solar time. The mechanism for operating the solar hands 6 and 7 will be described hereinafter.

The face 2 of the clock has numbers one to twenty-four printed thereon and indicated at 8 for showing sidereal time. The sidereal sweep second hand is shown at 9, the sidereal minute hand is shown at 10 and the sidereal hour hand is shown at 11. All of these hands are moved by a mechanism hereinafter described. The hands 9, 10 and 11 will pass over the hands 6 and 7 of the solar clock because the depression 3 receives the hands 6 and 7. In addition to the numbers 8, I provide markings 12 to indicate sidereal minutes and every fifth marking is numbered from five to sixty inclusive, to indicate sidereal minutes or seconds. The numbers from five to sixty inclusive, are shown at 13.

It is possible to manually adjust the solar hands 6 and 7 by means of a knob 14 that is connected to the hands in a manner presently to be described. In like manner, a knob 15 may be adjusted for moving the sidereal sweep second hand 9, and a knob 16 may be manually adjusted for moving the sidereal minute and hour hands 10 and 11. All of these manual corrections may be made without interfering with the proper functioning of the clock mechanisms.

In Figure 2 I show how the solar and sidereal clock hands are operated from a single synchronous motor indicated generally at 17. This motor may be of the self-starting type, if desired, and will operate from a source of alternating current which is regulated or controlled to provide a reliable source of solar time. It is possible to use a spring-wound motor as a source of power rather than the electric motor 17, if desired, as the improvement in the art is to offer a convenient method of obtaining sidereal time where the prime mover is regulated in indicate solar time.

The motor 17 rotates a gear 18 and the gear 18 meshes with a gear 19 having one hundred teeth. The gears in Figure 2 are shown twice their natural size for clarity. The gear 19 carries a pinion 20 with ten teeth and the pinion meshes with a gear 21 that has forty-five teeth. The gear 21 carries a pinion 22 with twelve teeth and the pinion meshes with a large gear 23 having forty-eight teeth. The gear 23 has an integral gear 24 that has eighteen teeth thereon and this gear rotates at three and one third revolutions per minute, solar time. It is this gear 24 that is operatively connected to the solar timekeeping mechanism, and also to the sidereal timekeeping mechanism. I will first describe the solar timekeeping mechanism.

A large gear 25 having sixty teeth meshes with the gear 24 and this gear is rotatably mounted on a shaft 26 that carries the solar minute hand 6. The gear 25 carries a pinion 27 having nine teeth and this pinion meshes with a large gear 28 having sixty teeth. The large gear 28 also carries a pinion 29 that has seven teeth thereon and the pinion 29 meshes with a large gear 30 having sixty-three teeth thereon.

It will be noted from Figure 2 that the gear 30 is rigidly connected to a large gear 31 by means of a hub 32. The hub 32 frictionally engages with a sleeve 33 and this sleeve is rigidly secured to the shaft 26. A rotation of the gear 30 will cause the shaft 26 to rotate and thus move the minute hand 6, but it is possible to manually rotate the shaft 26 when it is desired to correct the time indicated by the solar hands 6 and 7. The sleeve 33 has a gear 34 connected thereto and a pinion 35 may be moved into mesh with the gear 34 when it is desired to correct the solar time. The pinion 35 is carried by a shaft 36 on which the knob 14 is mounted. Before the knob 14 is rotated for correcting the solar time, it is manually moved inwardly against a spring, not shown, to mesh the pinion 35 with the gear 34. The pinion 35 will be automatically disconnected from the gear 34 when the knob 14 is released.

The shaft 26 has a gear 37 that is rigidly connected thereto and the gear has twelve teeth. The gear meshes with a large gear 38 provided with forty-eight teeth. A gear 39 with fifteen teeth is rigidly secured to the gear 38 and meshes with a large gear 40 which has forty-five teeth. The gear 40 is rotatably mounted on the shaft 26 and carries a sleeve 41 that in turn has the hour hand 7 connected therewith. The gear train 37, 38, 39 and 40 has a ratio of one to twelve in order that the minute hand 6 will make twelve revolutions to one revolution of the hour hand 7.

I will now explain the mechanism for actuating the sidereal hands 9, 10 and 11. A gear 42 meshes with the gear 24 and has forty-eight teeth. The gear 42 is rotatably mounted upon a shaft 43 and the gear will rotate one and one fourth revolutions per minute solar time. A pinion 44 is rigidly connected to the gear 42 and carries sixteen teeth. A large gear 45 having sixty teeth is concentrically mounted with respect to the shaft 43. The gear 45 carries a stud 47 that in turn rotatably carries two planetary gears 48 and 49 that are rigidly connected together by a hub 47'. The gear 48 has twenty teeth and meshes with the gear 44, while the gear 49 has eighteen teeth and meshes with a gear 50 that has eighteen teeth and is keyed to the spindle or shaft 43.

The number of teeth chosen for the gear or pinion 44 will cause the spindle 43 to make one revolution for each minute of mean solar time. The prime mover or motor 17 will rotate the pinion 44, one and one fourth revolutions per minute, solar time, and the gear 50 will rotate the spindle 43, one revolution per minute, solar time. The sidereal sweep second hand 9 is mounted on the spindle 43. Should the gear 45, therefore, be held against rotation, the sidereal sweep second hand 9 would indicate solar time. Before describing how the gear 45 is rotated in order to cause the sweep second hand 9 to indicate sidereal time instead of solar time, it is best to describe the gear trains that operate the sidereal hand 10, and the sidereal hour hand 11.

A pinion 51 has nine teeth and is mounted on the spindle 43 by soft friction so that it may slip on the shaft 43 during the setting of the hands 10 and 11 by the knob 16. This pinion meshes with a large gear 52 that has sixty teeth. A pinion 53 having seven teeth is rigidly connected to the gear 52 and meshes with a large gear 54 that has sixty-three teeth. The gear 54 is keyed to a sleeve 55 that in turn carries the sidereal minute hand 10. The sleeve has a gear 56 rigidly secured thereto and a pinion 57 may be manually moved into engagement with the gear 56 for rotating the sleeve 55 and setting the minute hand 10. The pinion 57 is mounted on a shaft 58 that carries the knob 16.

A pinion 59 is keyed to the sleeve 55 and has fourteen teeth. This pinion meshes with a large gear 60 that has fifty-six teeth, and this large gear in turn carries a pinion 61 that has ten teeth. The pinion 61 meshes with a large gear 62 provided with sixty teeth. The gear 62 carries a sleeve 63 that is rotatably mounted on the sleeve 55. The sleeve 63 carries the sidereal hour hand 11. The ratio of the gear train 51, 52, 53 and 54 is one to sixty, while the ratio of the gear train 59, 60, 61 and 62 is one to twenty-four. This will cause the sidereal sweep second hand 9 to make sixty revolutions for one revolution of the sidereal minute hand 10, and will cause the sidereal minute hand 10 to make twenty-four revolutions for one revoltuion of the sidereal hour hand 11.

I will now describe how the gear 45 is rotated for adding to the sidereal clock mechanism 3.942588235 minutes per day. The gear 45 is connected to the gear 31 by two gears 64 and 65 that are frictionally connected together. The gears 64 and 65 are not shown in their full size in the diagrammatic showing of Figure 2, but are shown in Figure 1 by dotted lines and also in Figure 3. The gear 64 is rigidly connected to a hub 66, while the gear 65 is frictionally secured to the hub. The gear 64 has seventy-one teeth and the gear 65 has eighty-five teeth. Since the gear 31 has fifty-nine teeth and rotates twenty-four times in one solar day, the gear 45 will be rotated 19.712941176 revolutions in the same period of time in a clockwise direction. Since the planetary ratio of the train of gears 44, 48, 49 and 50 is four to five, it requires five revolutions of the gear 45 to impart one additional revolution to the sidereal sweep second hand 9 over that already imparted to it by the gear train 44—50. In other words, if the gear 44 were held stationary and the gear 43 is retained in mesh with the gear 44, one revolution of gear 45 clockwise, would cause only one-fifth of a revolution of the sidereal sweep second hand clockwise. As already stated the gear 45 is caused to make 19.712941176 revolutions in a clockwise direction in twenty-four hours, solar time, therefore the sidereal sweep second hand 9 will make one-fifth of 19.712941176 revolutions or 3.942588235 revolutions every twenty-four hours solar time, over and in addition to the number of revolutions imparted to it by the gear train 44—50 every twenty-four hours solar time. This represents the adding in of sufficient sidereal time units over the number of solar time units to equal the sidereal time. This is a very close approximation of sidereal time because in a year of running the sidereal clock will only be .024 second slow with respect to what the actual sidereal time would be corresponding to the time indicated by the solar time indicating hands.

It is possible to manually set the sidereal sweep second hand 9 in the following manner: The hub 66 has a gear 67 rigidly secured thereto and a pinion 68 may be moved into mesh with the gear 67 for rotating it. The gear 68 is mounted on a shaft 69 and the knob 15 is manually rotated for rotating the gear 67. The turning of the knob 15 will rotate the gear 64 and the gear 45. The gear 45 in rotating, will carry with it the planetary gears 48 and 49 and the gear 49 will rotate the gear 50 and shaft 43 for moving the sidereal sweep second hand 9 in the desired direction.

The clock face, as already stated, shows at once both solar time and sidereal time that corresponds therewith. The sidereal clock hands are caused to move at a faster rate than the solar clock hands by a mechanism deriving its power from the solar clock mechanism. The gears chosen for operating the sidereal clock mechanism at a faster rate than the solar clock mechanism are small in size so as to readily fit into a standard clock casing. It would be possible to add a sweep second hand to the solar dial 4 by the addition of suitable gearing, without affecting the gear train that causes the sidereal clock to move faster than the solar clock.

There are 365.2421 solar days in a year and 366.2421 sidereal days in the same year. The ratio of solar days to sidereal days is 1.00273791. Each solar day, 3.94258933 minutes must be added into the sidereal clock. In other words, each day the sidereal minute hand must traverse 3.94258933 more of those divisions marked from one to sixty on the dial than does the solar minute hand. The gears 31, 65, 64, 45, 49 and 50, add in 3.942588235 minutes a day to the shaft 43, and this increment is a very close approximation of sidereal time, the loss in a year amounting to .024 of a second.

It is to be understood that wherever the words "solar time" are used, means solar or mean time is meant.

While I have shown only the preferred form of my invention, it should be understood that various changes or modifications may be made within the scope of the appended claims without departing from the spirit of the invention.

I claim:

1. In combination, a gear, means for rotating the gear in direct ratio to a unit of solar time, a solar time-keeping clock actuated by the gear, a second timekeeping clock actuated by the gear and including a planetary gear train, and gear connections between the solar clock and the planetary gear train for adding in sufficient revolutions for causing the second clock to keep sidereal time.

2. In combination, a solar clock mechanism, a second clock mechanism, common means for operating both mechanisms and for causing the solar clock to keep mean solar time, said second clock mechanism including a planetary gear train, and a train of gears connecting the solar clock with the planetary gear train for causing the second clock mechanism to keep sidereal time.

3. In combination, two sets of time indicating means, common means for actuating both sets of time indicating means, said common means being regulated to give mean solar time, means operatively connected to one of said sets of time indicating means for continually causing the other time indicating means to function at a higher rate of speed and indicate sidereal time, said last named means including a planetary gear train.

4. In combination, two sets of time indicating means, a common prime mover for operating both of said sets of time indicating means, means interconnecting said sets of time indicating means for providing a definite ratio between the time indicating means, said interconnecting means including a planetary gear train.

5. In combination, two clock mechanisms common means for operating both mechanisms and regulated to keep mean solar time, means interconnecting the two clock mechanisms for causing one of them to keep sidereal time, said last named means including a planetary gear train.

6. In combination, a solar clock mechanism, a second clock mechanism, common means for operating both clock mechanisms and causing the solar clock to keep mean solar time, a gear included in the solar clock mechanism and rotated by the mechanism, a second gear in the second clock mechanism and rotating independently thereof, a gear train interconnecting the first and second gears for causing the second gear to rotate at a predetermined speed, a planetary gear train including two sun and two planetary gears, the planetary gears being connected together and rotating in unison on a shaft carried by the second gear, the two sun gears connecting the planetary gears with the common operating means and with the second clock mechanism, whereby the first and second gears, and the interconnecting gear train will cooperate with the planetary gear train for causing the second clock mechanism to keep sidereal time.

GEORGE R. McDONALD.